June 14, 1960

H. NEUWIRTH 2,940,709

CAMERA TRIPOD

Filed Aug. 11, 1958

INVENTOR.
Herman Neuwirth
BY
ATTORNEYS

June 14, 1960 H. NEUWIRTH 2,940,709
CAMERA TRIPOD
Filed Aug. 11, 1958 2 Sheets-Sheet 2
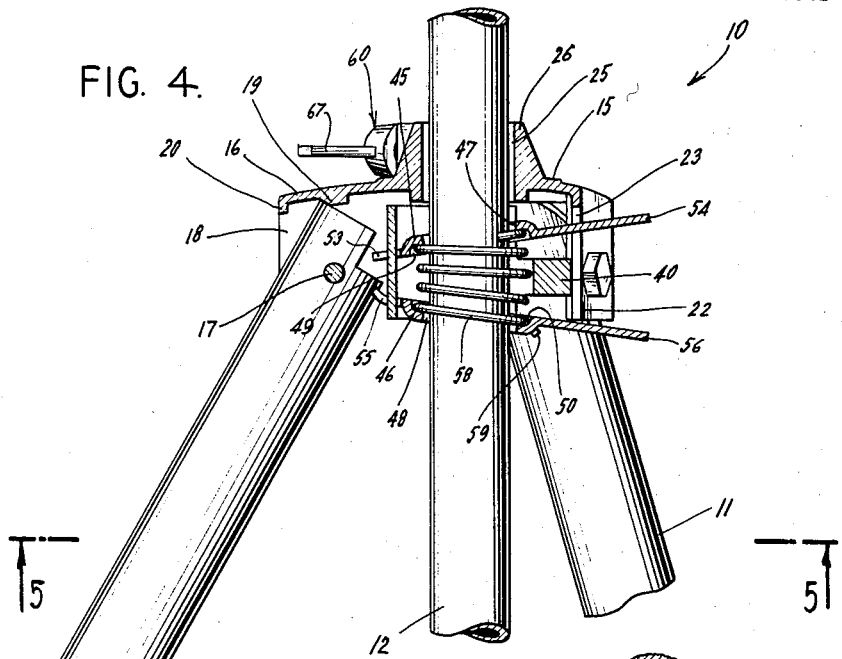
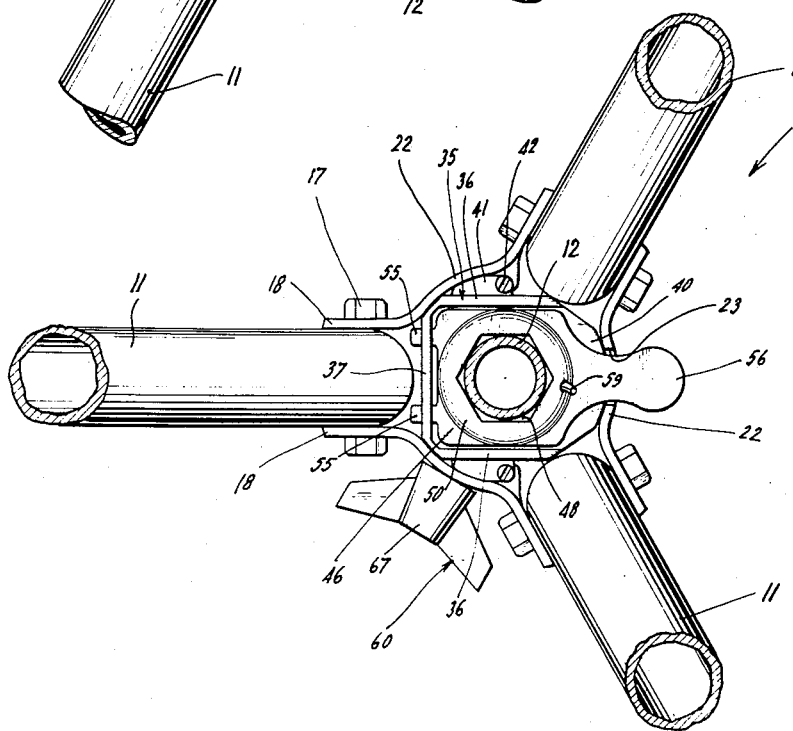
INVENTOR.
Herman Neuwirth
BY
ATTORNEYS United States Patent Office 2,940,709
Patented June 14, 1960

2,940,709

CAMERA TRIPOD

Herman Neuwirth, Fort Lee, N.J., assignor to Testrite Instrument Co., Inc., Newark, N.J., a corporation of New York Filed Aug. 11, 1958, Ser. No. 754,354

5 Claims. (Cl. 248—168)

This invention relates generally to a camera tripod, and is specifically concerned with novel means for effecting vertical adjustment thereof.

While the device of the instant invention has been primarily developed and employed in connection with camera tripods, and will be illustrated and described hereinafter with particular reference thereof, it is appreciated that the novel structure disclosed is capable of many varied applications all of which are intended to be comprehended herein.

As is well known to those versed in the arts, the vertical adjustment of a camera supported on a tripod is relatively difficult, often time-consuming, and occasionally results in damage to the camera. While better quality camera tripods often employ a normally vertical shaft which carries the camera on its upper end and is vertically shiftable relative to the tripod legs and head, so as not to require movement of the legs in vertical adjustment, even this relatively expensive structure is subject to the above mentioned difficulties.

Accordingly, it is one object of the present invention to provide a camera tripod construction which overcomes the above discussed disadvantages of the prior art, enabling a camera to be quickly and easily adjusted to any desired vertical position, without likelihood of damage to the equipment.

It is a more particular object of the present invention to provide a camera tripod construction of the type described which includes both quick release and firm securement holding means, to thereby afford rapid adjustability to any desired elevation as well as firm and secure holding of the camera at the selected elevation.

It is a further object of the present invention to provide a tripod construction having the advantageous characteristics mentioned in the preceding paragraphs which is extremely simple in structure and operation, durable and reliable in use, and which can be economically manufactured and sold.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Fig. 4 is a partial sectional view taken substantially along the line 4—4; and

Fig. 5 is a horizontal sectional view taken substantially along the line 5—5.

Figure 1:
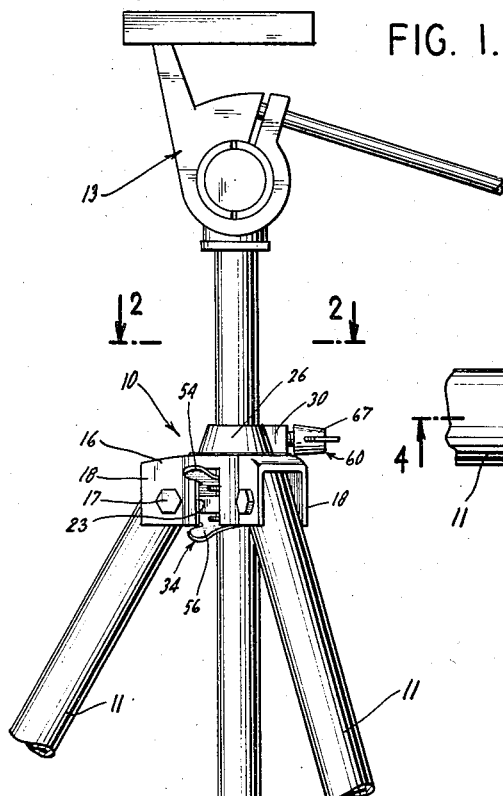
Fig. 1 is a partial elevational view showing a tripod constructed in accordance with the teachings of the present invention.
Figure 2:
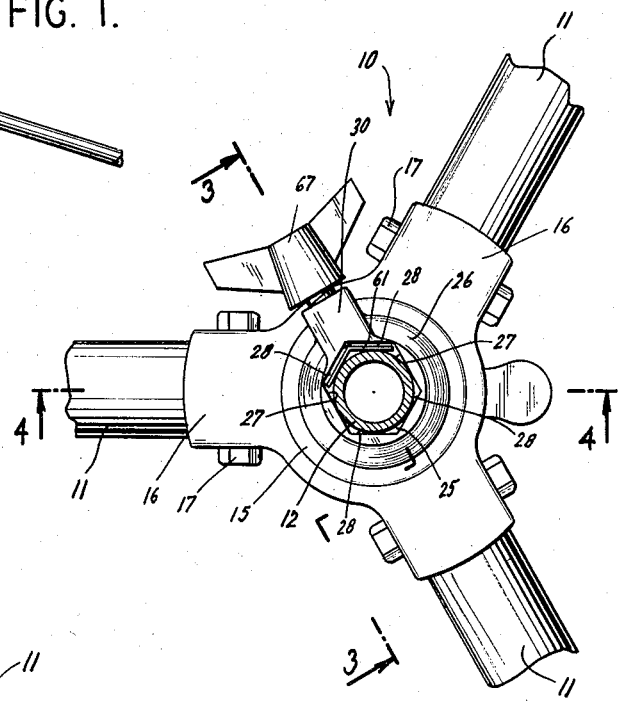
Fig. 2 is a horizontal sectional view taken substantially along the line 2—2 of Fig. 1, with the structure rotated 120° for convenience in illustration.
Figure 3:
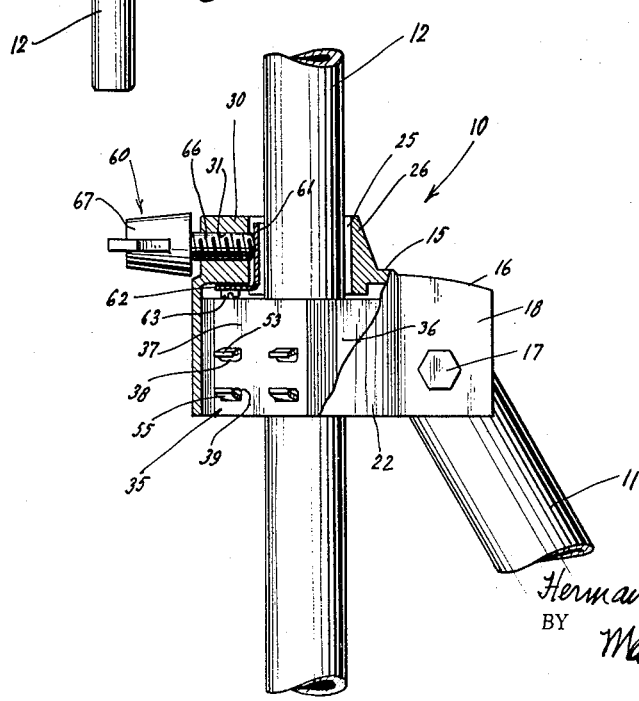
Fig. 3 is a partial sectional view taken substantially along the line 3—3.

Referring now more particularly to the drawings, and specifically to Figs. 1 and 2 thereof, the tripod of the present invention includes a generally horizontally disposed head 10, supported in elevated condition by a plurality of depending ground engageable legs 11. A normally vertically disposed shaft or post 12 extends through the head 10, being vertically adjustable relative to the latter, and is provided on its upper end with a universally adjustable camera carrying bracket 13. The bracket 13 may be of any conventional design and forms no part of the instant invention, so that further description thereof is unnecessary.

The head 10 includes a generally horizontal top wall 15 of generally circular configuration and provided with a plurality of radially outwardly projecting, downwardly facing channel shaped members 16 each receiving the upper end of and pivotally connected to a respective leg 11, as by a pin 17 extending between the depending side walls 18 of the respective channel. As best seen in Fig. 4, the interior of each channel 16 is provided with stop lugs or bosses 19 and 20 on the underside of the respective channel top wall for limiting engagement with the adjacent legs 11. Thus, the upper end of each leg 11 is engageable with the radially inner boss 19 in its spread or open condition, and engageable with the radially outer lug or boss 20 in its closed condition, to limit the legs to the desired movement.

Depending from the periphery of the top wall 15, and extending therealong between each adjacent pair of radial head extensions 16, is a skirt section or wall 22. One of the skirt sections or walls 22 is provided with a generally vertically disposed, downwardly opening cut out or slot 23.

Centrally of the top head wall 15 is formed a through aperture or opening 25; and, an upstanding sleeve or annular wall 26 is provided on the upper surface of the top head wall 15 extending about the bounding edge of the aperture 25 and combining to define of the latter a vertical extending through passageway. As best seen in Fig. 2, the internal cross section of the through opening or passageway 25 is of generally polygonal, and specifically hexagonal configuration. Further, one pair of opposite sides of internal surfaces 27 of the passageway 25 are preferably slightly longer than the remaining internal surfaces 28. Projecting generally radially outward from the upstanding annular wall 26, and specifically in radial alignment with the intersection of an adjacent pair of internal surfaces or sides 28, is a boss 30. The latter boss is provided with an internally threaded through bore 31 disposed radially of the opening or passageway 25.

Interiorly of the head 10 is located a quick release holding means, generally designated 34, for holding engagement with the camera carrying shaft 12 at any selected vertical poistion of the latter. The shaft 12 is preferably of generally circular, or other similar cross sectional configuration.

The quick release holding means 34 includes an open housing 35, see Fig. 5, which is of generally rectangular configuration and disposed within the head 10 between the upper ends of legs 11. The housing 35 includes a pair of generally parallel, vertically disposed side walls 36 located on opposite sides of and spaced from the shaft or post 12, and includes an additional generally vertically disposed side wall 37 extending between one adjacent pair of ends of the side walls 35. The housing side wall 37 is located opposite to or remote from the head side wall or section 22 having the cut out or slot 23, and is itself provided with a plurality of generally horizontally disposed through openings or slots 38 and 39. In particular, one pair of laterally spaced, generally horizontally aligned slots are designated 38, while a second pair of laterally spaced, horizontally aligned slots are designated 39 and respectively located below the slot 38.

Extending between the other ends of housing walls 26, adjacent to the vertical slot 23 of the adjacent head wall or section 22 is a housing portion 40 of vertically reduced and laterally increased cross sectional dimension, as seen in Fig. 4. The housing portion 40 is therefore relatively rigid and defines a stop or abutment, as will appear more fully hereinafter. The upper ends of housing walls 36 are each provided with an outstanding ear or securement lug 41, see Fig. 5, through which extends a fastener 42 into the housing top wall 15 for rigidly securing the housing in position within the head. It will now be appreciated that the housing is vertically open, in alignment with and opening into the lower end of the passageway 25, while opening downward from the head 10 and spaced by receiving or circumposed about the camera carrying shaft or post 12.

Interiorly of the housing 35, circumposed about the shaft 12, are a pair of vertically spaced generally annular members or gripping plates 45 and 46, the former being above the latter. Viewed otherwise, the upper gripping plate 45 is formed with a generally central hexagonal through aperture or opening 47, while the lower gripping plate 46 is provided with a similar, central through aperture or opening 48, which apertures both receive the shaft 12. It will be noted that the gripping plate 45 is dished or recessed on its underside, as at 49, surrounding its aperture 47, while the lower gripping plate 46 is dished or recessed on its upper side, as at 50, surrounding its aperture 48. The central plate apertures 47 and 48 are of a size to loosely and slidably receive the shaft 12 while the plates are disposed approximately normal to the shaft.

The plates 45 and 46 may both be of generally rectangular outline configuration, the latter plate being so illustrated in Fig. 5, for loose conforming reception in the housing 35, between the housing walls 36 and 37. Projecting from the outer edge of the upper plate 45 adjacent to the housing wall 37 loosely through the upper slots 38 of the latter wall are a pair of tabs 53, whereby the upper plate is constrained to swinging movement about the tab in slot connection 38, 53 as a pivotal axis. Projecting from the opposite external edge of the upper gripping plate 45, over the housing part 40, through and out of the slot 23, is an extension 54.

Similarly, the lower plate 46 is provided on its edge adjacent to the housing wall 37 with a pair of laterally spaced tabs 55 projecting loosely through respective lower slots 39 and combining therewith to define a pivotal connection for the lower plate. The tabs 55 are preferably turned upward toward their distal ends to prevent withdrawal of the lower plate from the housing in the absence of shaft 12. The lower plate 46 is further provided with an extension 56 projecting outward opposite to the tabs 55, under the housing part 40, and spaced below the extension 54 of the upper plate 45. Circumposed about the shaft 12 and interposed between the upper and lower plates 45 and 46 is a coil compression spring 58 which has its upper and lower end convolutions respectively seated in the recesses 49 and 50 of the upper and lower gripping plates. In addition, one end 59 of the spring 58, the lower end thereof, passes through and is hooked to the lower plate 46, to further prevent the possibility of the latter plate being removed from the housing.

The head 10 is also provided with clamping means, generally designated 60 and including a plate 61 bent to define a dihedral angle approximately equal to that defined between the faces 28 of passageway 25 adjacent to the boss 30. The plate 61 is conformably received in the passageway 25 adjacent to and facing toward the last mentioned surfaces 28, so as to be positioned in front of the boss 30. A flange 62 extends from the lower end of the plate 61 beneath the housing top wall 15 and is there slidably or loosely secured to the housing top wall by a fastener or pin 63. The flange 62 may be loose on the pin 63, or the flange may be provided with a slot disposed generally radially of the head, either construction satisfactorily affording slight radial motion of the plate 61. As best seen in Fig. 2, the plate 61 is interposed in the passageway 25 between the shaft 12 and a pair of side walls or faces of the passageway.

In addition, the clamping means 60 includes a screw 66 threaded in the bore 31 of boss 30 having a manually actuable inner end engageable with the plate 61 to selectively effect firm clamping and releasing action of the plate 61 with respect to the shaft 12.

While the operation of the instant construction is believed obvious from the foregoing description, a brief resume of operation follows. With the clamping plate 61 released from clamping engagement with the shaft 12, as by slight withdrawal of the threaded member 66, vertical adjustment of the shaft may be effected by operation of the quick release of holding means 34. That is, the plate extensions 54 and 56 may be squeezed together by an operator's hand, as between the thumb and forefinger, into a position in limiting engagement with the housing part 40. The plates will then be in approximate parallelism with each other, and normal to the shaft 12 for loose or sliding reception of the latter in the polygonal plate openings 47 and 48. In this condition, the shaft may be vertically shifted to the desired camera elevation. At this elevation, the extensions 54 and 56 are released, and immediately spread apart under the expansion force of the spring 58 to swing the plates 45 and 46 away from each other into the angular relation illustrated in Fig. 4. In this angular relation the bounding edges of the plate apertures 47 and 48 are in binding engagement with the received portions of the shaft 12 and effectively retain the latter in the selected position of adjustment. This binding action is enhanced by the polygonal configuration of the plate apertures 47 and 48, whereby the binding pressure is localized, see Fig. 5, to increase the gripping or biting action against the shaft. This selected position of adjustment may be firmly fixed by inward screwing movement of the threaded member 66 to firmly clamp the shaft 12 between the latter plate and the opposite internal surfaces 28, see Fig. 2.

Of course, the shaft 12 may be released by reversal of the above described procedure. Further, the shaft 12 may be completely withdrawn from the head 10, if desired, without adversely affecting the assembly of parts.

From the foregoing it is seen that the present invention provides a tripod construction which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In a tripod construction, a generally horizontal head top wall having a generally vertically extending central aperture of equilateral polygonal configuration having three equally-spaced corners, three downwardly facing generally channel shaped members extending radially from said head top wall in equal angularly spaced apart relation in alignment with respective corners of said aperture, three legs each having its upper end received within and pivotally connected to a respective channel member for swinging movement between a downwardly diverging operative position and a generally parallel collapsed position, abutment elements in said channel members engageable with the upper ends of said legs to limit outward swinging movement thereof to said operative position, a vertically open housing fixedly carried on the underside of said top wall centrally thereof in registry with said central aperture, said housing including a generally vertical side wall extending across the inner end of one of said channel members, a generally vertical support shaft extending loosely through said top wall aperture and said housing, a pair of centrally apertured gripping plates arranged in generally horizontal vertically spaced relation loosely circumposed about said shaft and spaced within said housing, the apertures of said gripping plates being congruent to each other and of equilateral polygonal configuration having three equally-spaced corners and arranged in substantial registry with the aperture of said top wall, tabs projecting from one side of each of said plates loosely through said housing side wall to mount said plates for relative swinging movement between substantial parallelism loosely receiving said shaft and an angular relation in binding engagement with said shaft, resilient means conencted to said gripping plates to urge the latter toward their angular relation, and actuating extensions on said gripping plates extending from the plate sides opposite to said one side thereof beyond said top wall into the space between the remaining one of said channel members for manually swinging said plates between said parallelism and angular relation.

2. A tripod construction according to claim 1, said housing being generally rectangular to rigidify said top wall, said housing having one side open opposite to said one side wall, said plates being generally rectangular and loosely received in said housing with said extensions passing through said open housing side.

3. A tripod construction according to claim 2, said tabs on the lower of said plates extending upwardly to prevent inadvertent removal from said one side wall.

4. A tripod construction according to claim 3, said resilient means comprising a coil spring circumposed about said shaft between said plates and having its lower end interengaged with the lower of said plates for securement thereof.

5. In a tripod construction, a generally horizontal head top wall having a generally vertically extending central aperture of equilateral polygonal configuration having three equally-spaced corners, supporting legs connected to said head top wall at spaced locations thereabout, a vertically open housing fixedly carried on the underside of said top wall in registry with said central aperture, a generally vertical support shaft extending loosely through said top wall aperture and said housing, a pair of centrally apertured gripping plates arranged in generally horizontal vertically spaced relation loosely circumposed about said shaft and spaced within said housing, the apertures of said gripping plates being congrunent to each other of equilateral polygonal configuration having three equally spaced corners and arranged in substantial registry with the aperture of said top wall, tabs projecting from one side of each of said plates loosely through a side wall of said housing to mount said plates for relative swinging movement between substantial parallelism loosely receiving said shaft and an angular relation in binding engagement with said shaft, resilient means connected to said gripping plates to urge the latter toward their angular relation, and actuating means on said gripping plates for manually swinging said plates between said parallelism and angular relation.

References Cited in the file of this patent

UNITED STATES PATENTS

| | | |
|---|---|---|
| 768,987 | Graf | Aug. 30, 1904 |
| 836,303 | Christensen | Nov. 20, 1906 |
| 2,090,550 | Pilblad | Aug. 17, 1937 |
| 2,413,342 | Symons | Dec. 31, 1946 |
| 2,633,319 | Musial | Mar. 31, 1953 |
| 2,645,951 | Sponsler | July 21, 1953 |